United States Patent [19]

Reuben

[11] Patent Number: 5,171,619
[45] Date of Patent: Dec. 15, 1992

[54] FLOOR MAT AND PROCESS OF FORMING THE SAME

[75] Inventor: Harold Reuben, Akron, Ohio

[73] Assignee: The Akro Corporation, Canton, Ohio

[21] Appl. No.: 687,234

[22] Filed: Apr. 18, 1991

[51] Int. Cl.⁵ .......................... B29C 19/00; B32B 3/10
[52] U.S. Cl. ...................................... 428/95; 428/120;
    428/139; 428/309.9; 156/60; 156/72
[58] Field of Search ..................... 428/309.9, 139, 120,
    428/95, 99; 156/72; 264/167

[56] References Cited

U.S. PATENT DOCUMENTS

| | | | |
|---|---|---|---|
| 3,804,699 | 4/1974 | Johnson | 428/96 |
| 3,821,065 | 6/1974 | Copeland et al. | 156/72 |
| 3,968,284 | 7/1976 | George | 428/90 |
| 4,174,991 | 11/1979 | Reuben | 156/242 |
| 4,230,755 | 10/1980 | Morris | 428/95 |
| 4,340,633 | 7/1982 | Robbins, Jr. | 428/99 |
| 4,382,986 | 5/1983 | Reuben | 428/95 |
| 4,421,809 | 12/1983 | Bish et al. | 428/90 |
| 4,464,720 | 8/1984 | Bell et al. | 428/85 |
| 4,529,639 | 7/1985 | Peoples, Jr. et al. | 428/95 |
| 4,579,764 | 4/1986 | Peoples, Jr. et al. | 428/95 |
| 4,588,628 | 5/1986 | Roth | 428/85 |
| 4,609,580 | 9/1986 | Rockett et al. | 428/198 |
| 4,673,603 | 6/1987 | Roth | 428/85 |
| 4,748,063 | 5/1988 | Reuben | 428/78 |
| 4,749,602 | 6/1988 | Russell | 428/99 |
| 4,751,764 | 6/1988 | Reuben | 16/8 |
| 4,758,457 | 7/1988 | Altus | 428/82 |
| 4,849,277 | 7/1989 | Jaklosky | 428/139 |

FOREIGN PATENT DOCUMENTS

| | | | |
|---|---|---|---|
| 0259795 | 3/1988 | European Pat. Off. | |
| 2619361 | 11/1977 | Fed. Rep. of Germany | 428/95 |
| 47-8159 | 3/1972 | Japan | 428/96 |
| 2171901 | 9/1986 | United Kingdom | 428/95 |

Primary Examiner—Alexander S. Thomas
Attorney, Agent, or Firm—Bell, Seltzer, Park & Gibson

[57] ABSTRACT

An automotive floor mat and process of forming the same is provided. The floor mat comprises an uppermost face layer, a base layer of thermoplastic material and a lowermost polyurethane foam layer. The base layer includes a main body and a plurality of elongate nib elements connected to and projecting downwardly therefrom, and in contact with and projecting through the polyurethane foam layer.

Formation of the nib elements, projection of them throughout polyurethane layer, and joining together of the base and polyurethane layers are accomplished substantially simultaneously.

11 Claims, 2 Drawing Sheets

FLOOR MAT AND PROCESS OF FORMING THE SAME

BACKGROUND OF THE INVENTION

The invention relates to floor mats such as those used in the passenger compartments of automobiles, and in particular to means for retaining such mat in place. The invention also relates to a process for making the mat.

Floor mats of the type found in automobiles generally are made of an elastomeric material or of a carpeted material or a combination of both. There is, however, a tendency of these mats to move or shift due to the action of the driver's or passenger's feet on the mat, particularly when getting in and out of the car. This results in the general disarray of the mats and can result in a potential danger if the mat is moved so as to interfere with the accelerator, brake pedal or clutch pedal of the automobile.

Various prior art efforts have been made to prevent slippage (i.e., "anti-slippage means") by use of permanent retention means such as hooks, snap fasteners, Velcro ® strips and the like. However, none of these are commercially successful because they tend to distract from aesthetics of the mat. Another solution is to use an array of downwardly extending projections or "nubs" to reduce slippage such as proposed, for example in commonly assigned U.S. Pat. No. 4,174,991 to Reuben. An alternative solution is to use a tacky adhesive on the undersurface of the mat such as proposed in U.S. Pat. No. 4,609,580 to Rockett et al. A combination of nubs and tacky adhesive has also been proposed in commonly assigned U.S. Ser. No. 07/642,926 filed Jan. 18, 1991.

The existing anti-slippage means have advantages and disadvantages. Mats equipped with downwardly projecting nubs and similar elements function best when the automobile flooring includes a face layer of carpeting which the nubs can readily penetrate. Nub-type anti-slippage means function less well when the automobile flooring consists of or includes hard carpeting or other material (e.g., plastic or rubber) which the nubs cannot readily penetrate. On the other hand, mats employing tacky adhesive material as the anti-slippage means function best when the automobile floor covering overlaid thereby consists of material which is clean, dry and hard. The tacky adhesive material means function less well when wet, and when the automobile floor covering has at its upper surface, dirt or fibrous material that can potentially transfer to the tacky adhesive. Such transfer can eventually render the tacky adhesive material incapable of performing its intended function. The difficulty of deciding whether to use nubs or tacky adhesive material as the anti-slippage means for an automobile floor mat is particularly acute when the mat is to be marketed as a "generic" one suitable for use in automobiles that are of different makes and/or that have different types of floor coverings.

SUMMARY OF THE INVENTION

The floor mat of the present invention has the advantage of combining extended projections with a layer of polyurethane foam having a high coefficient of friction. The mat preferably includes an uppermost face layer preferably having an attractive appearance, and optionally having an indicia formed therein of the make of the car. A base layer of thermoplastic material underlies and is secured to the uppermost layer. The base layer includes a main body and a plurality of elongated nib elements projecting downwardly therefrom. A polyurethane foam layer having a high coefficient of friction underlies the base layer and the elongated nib elements contact and extend through the foam layer.

Such a floor mat is formed by providing the base layer of thermoplastic material, placing the polyurethane foam layer beneath the base layer, forming the elongate nib elements and extending the nib elements through the polyurethane foam layer, and securing the face layer to the main body of the base layer.

DESCRIPTION OF THE DRAWINGS

Some of the objects and advantages of the present invention having been stated, otherwise will appear as the description proceeds, when considered in conjunction with the accompanying drawings, in which.

DESCRIPTION OF THE PREFERRED EMBODIMENTS

Figure 1:
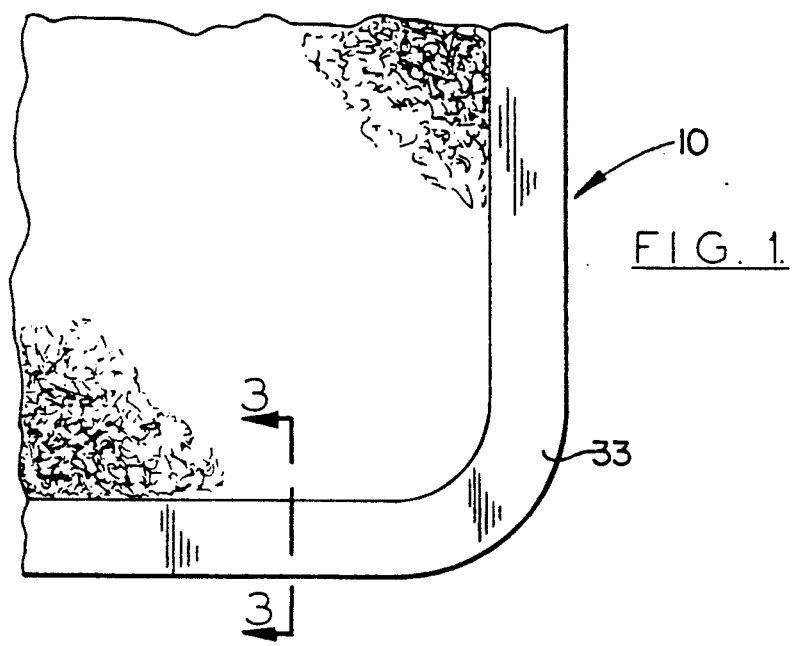
FIG. 1 is a fragmentary top plan view of an automobile floor mat in accordance with the invention.

The present invention now will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

Referring now more particularly to the drawings, the floor mat of the present invention is indicated generally by the reference character 10. As illustrated in the Figures, the floor mat 10 has three main components, namely an uppermost face layer 13, a base layer 15 of thermoplastic material, and a polyurethane foam layer 17. The base layer 15 includes a main body 21 and a plurality of elongate nib elements 23 that project downwardly from the main body 21 and through polyurethane foam layer 17.

Figure 3:
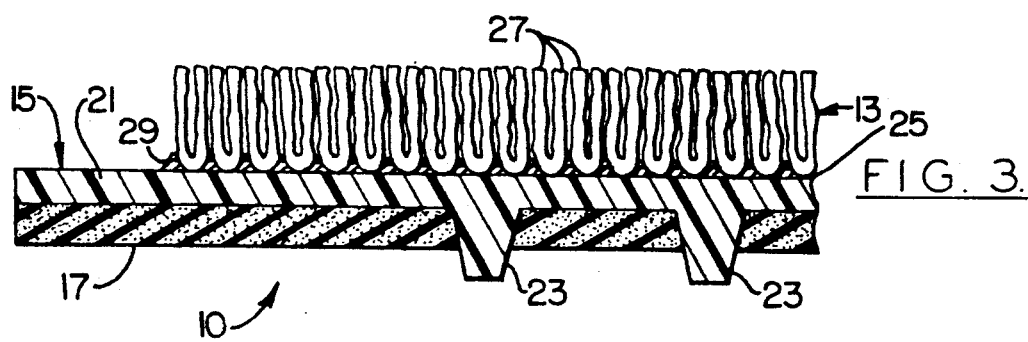
FIG. 3 is an enlarged fragmentary sectional view taken substantially along the line and in the direction of the arrows 3—3 of FIG. 1.

The uppermost layer 13 is preferably a carpet layer. A particularly desirable construction is one in which the carpet layer has a pleasing "hand" or feel, and also has an aesthetically pleasing pattern or design appeal. For example, as shown in FIG. 3, the uppermost face layer 13 can be a pile carpet having a primary backing 25 and pile yarns 27 extending from the primary backing to form loops which are preferably cut to form tufts. The tufted pile yarns 27 are maintained permanently in place using an adhesive coating 29, i.e., a "tuft-lock" coating or "precoat". The tuft-lock coating or precoat can be any suitable polymer. Preferably the coating is a polymer latex or a plastisol. Typical latex compositions include polyvinylidene chloride copolymer, polyvinyl chloride, styrene butadiene, ethylene vinyl acetate and the like. The face layer 13 can also be a sheet or film such as vinyl or a woven, non-woven or knitted fabric, formed of natural fibers, synthetic fibers or blends thereof.

The base layer 15 is a thermoplastic material, and preferably a thermoplastic material which can be easily extruded. Exemplary thermoplastic materials include polyvinyl chloride, polyethylene, ethylene vinyl acetate, polypropylene, polystyrene, thermoplastic rubber and the like. The thermoplastic materials are characterized by the capability of being extruded at a temperature of from about 200° F. to 400° F. in a soft condition, and of assuming a rigid shape when cool.

The base layer 15 preferably includes a main body 21 having a thickness of about 1/16 inch to about ¼ inch and a plurality of elongated nib elements 23 connected to and projecting substantially vertically downwardly from the main body 21. The nib elements 23 illustratively and preferably have a frusto-conical shape and a height of from about 1/16 inch to about ¼ inch. The nib elements 23 contact and extend through the polyurethane foam layer 17.

The polyurethane foam layer 19 preferably has a height or thickness of about half 1/16 inch to about 1/32 inch. The polyurethane foam layer is non-tacky and is characterized by having a high coefficient of friction so as to resist slippage or shifting of mat 102 relative to the surface upon which the mat is placed. When the surface is penetratable by nibs 23, the nibs also resist slippage of the mat.

Figure 2:
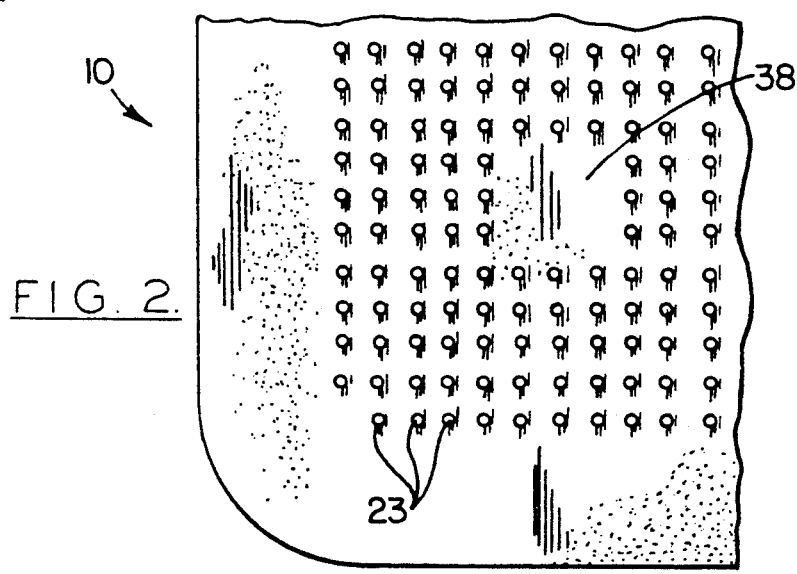
FIG. 2 is a fragmentary bottom plan view of the mat.

The mat 10 as is shown in FIGS. 1 and 2 preferably further includes binder material 33 which encircles the periphery of the mat 10 and preferably is secured to the layers 13, 15, 17 by stitching. The polyurethane foam layer 17 and the array of nib elements 23 preferably are present upon most of the undersurface of base layer 15 of mat 10. If it is known in advance that a particular mat 10 is to be used upon an automobile floor covering that includes a heel pad or other hard uncarpeted member, the undersurface of the mat could and preferably would be provided with a nib-free section 38 (see FIG. 2) in the area thereof overlying the hard uncarpeted member. The absence of nib elements 23 in the area 38 of course permits more intimate engagement between the polyurethane foam layer 17 and the underlying upper surface of the hard uncarpeted member (not shown).

Figure 4:
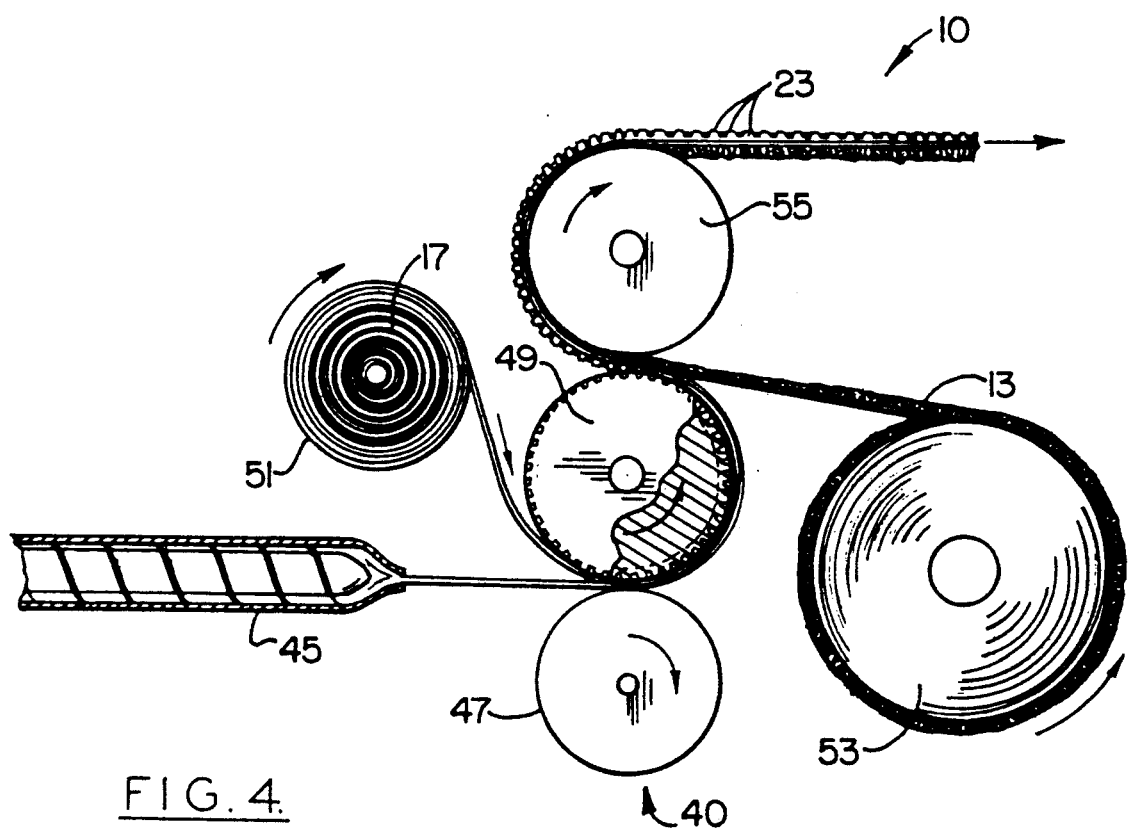
FIG. 4 is a diagrammatic and schematic illustration of the process for producing the mat.

An exemplary process for producing the floor mat 10 is shown in FIG. 4, wherein the production system is generally indicated by the reference numeral 40. The polyurethane material of lay 17 is withdrawn from a supply roll 51 as the base layer 15 of thermoplastic material is extruded by a conventional thermoplastic extruder 45 as for example an extruder available from Johnson Plastic Equipment of Rolling Meadows, Ill. The extruded thermoplastic material of layer 15 and the polyurethane material of layer 17 are directed to the nip between a feed roll 47 and the female of a nibbed roll 49 (shown in cutaway) which forms the elongate nib elements 23. This results in the polyurethane foam layer 17 and the base layer 15 being secured together substantially simultaneously, and in the nib elements 23 being formed and extending through the polyurethane foam layer 17. The face layer 13 is fed from a supply roller 53 and directed to the nip between the nibbed roll 49 and an exit roll 55 wherein the face layer 13 is secured to the main body 21 of the base layer 15.

It will be appreciated that a mat 10 in accordance With the present invention can be used on automobile flooring having carpeted areas or hard surface areas or both types of areas. The present mat is resistant to slippage and the tendency to shift due to the action of a driver's or passenger's foot.

In the drawings and specification, there have been disclosed illustrative embodiments of the invention and, although specific terms are employed, they are used in a generic and descriptive sense only and not for purposes of limitation, the scope of the invention being set forth in the following claims.

That which is claimed is:

1. An automobile floor mat comprising: an uppermost carpet face layer; a base layer of thermoplastic material, said base layer including a main body and a plurality of elongate nib elements connected to and projecting downwardly therefrom; and a lowermost polyurethane foam layer, said plurality of elongate nib elements being in connect with and projecting through said polyurethane foam layer.

2. An automobile floor mat according to claim 1 wherein the thermoplastic material is selected from the group consisting of polyvinyl chloride, polyethylene, ethylene vinyl acetate, polypropylene and polystyrene, and thermoplastic rubber.

3. An automobile floor mat according to claim 1 wherein the uppermost carpet layer includes tufted pile carpeting.

4. An automobile floor mat according to claim 3 wherein said tufted pile carpet includes a tuft-lock latex layer contacting the main body portion of the base layer.

5. An automobile floor mat according to claim 1 wherein the elongate nib elements have a frusto-conical shape.

6. An automobile floor mat according to claim 5 wherein the elongate nib elements have a height of from about 1/16 inch to about ¼ inch.

7. A process for forming an automobile floor mat having an uppermost carpet face layer, a base layer of thermoplastic material, the base layer including a main body and a plurality of elongate nib elements connected to and projecting downwardly therefrom, and a polyurethane foam layer underlying the base layer, said process comprising:

(a) providing the base layer thermoplastic material;
  (b) securing the polyurethane foam layer to the base layer;
  (c) forming the elongate nib elements and extending the nib elements through the polyurethane foam layer; and
  (c) securing the face layer to the main body of the base layer.

8. A process according to claim 7 wherein the thermoplastic material is selected from the group consisting of polyvinyl chloride, polyethylene, ethylene vinyl acetate, polypropylene and polystyrene, and thermoplastic rubber.

9. A process according the claim 7 whereby the uppermost carpet face layer is a layer of tufted pile carpet.

10. A process according to claim 7 whereby the step of securing the uppermost layer includes providing a tuft-lock latex layer contacting the main body portion of the base layer.

11. A process according to claim 7 whereby step of (b) and step (c) are performed substantially simultaneously.

* * * * *

UNITED STATES PATENT AND TRADEMARK OFFICE
CERTIFICATE OF CORRECTION

PATENT NO. : 5,171,619

DATED : December 15, 1992

INVENTOR(S) : Reuben

It is certified that error appears in the above-identified patent and that said Letters Patent is hereby corrected as shown below:

Column 4, line 52, "7" should be --1-- after the word claim.

Column 4, line 57, "7" should be --6-- after the word claim.

Column 4, line 63, "7" should be --1-- after the word claim.

Signed and Sealed this

Twenty-first Day of December, 1993

Attest:

BRUCE LEHMAN

Attesting Officer

Commissioner of Patents and Trademarks